A. LOWE.
Cow-Stalls.
No. 150,589. Patented May 5, 1874.
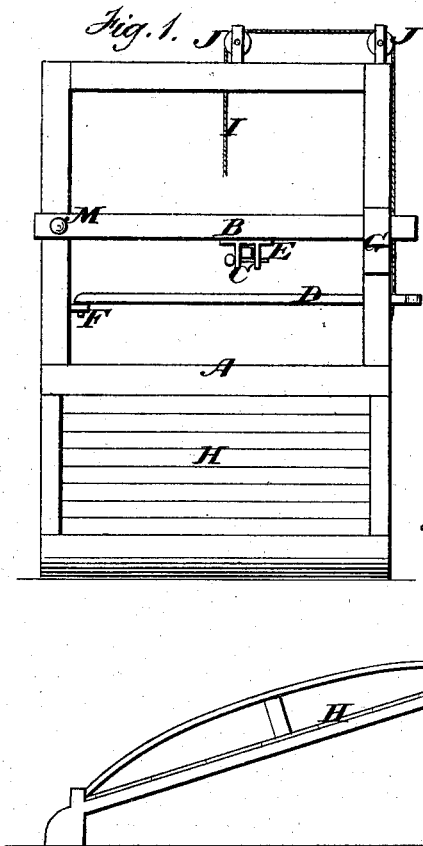
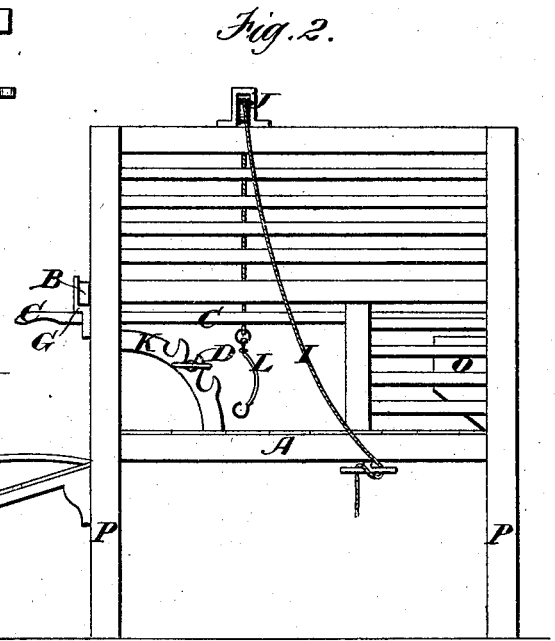
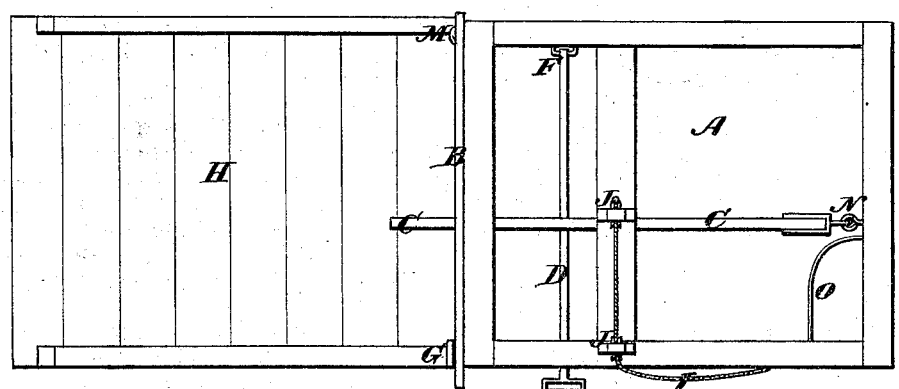
Witnesses.
Wm. H. Goodwin
J. J. Yearout
Inventor:
Alexander Lowe.

UNITED STATES PATENT OFFICE.

ALEXANDER LOWE, OF NASHVILLE, TENNESSEE.

IMPROVEMENT IN COW-STALLS.

Specification forming part of Letters Patent No. 150,589, dated May 5, 1874; application filed March 20, 1871.

*To all whom it may concern:*

Be it known that I, ALEXANDER LOWE, of Nashville, in the county of Davidson and State of Tennessee, have invented certain new and useful Improvements in Cow-Stalls, of which the following is a specification:

My invention relates to improvements in devices for readily milking unruly cows, by confining them in a peculiarly-constructed elevated stall, and at the same time preventing such animals from kicking; and, with these ends in view, my invention consists of a longitudinal bar, pivoted, or otherwise adjustably attached, to the forward end of the stall, and provided at its rear end with a cross-bar, which is capable of being adjusted both vertically and longitudinally, to adapt said bar to the height and length of the cow introduced into the stall, in combination with an adjustable cross-bar introduced between the hind legs of the animal to prevent her from kicking, as hereinafter more fully set forth.

A is a platform, supported in an elevated position by columns P, which also support the fence surrounding the platform and one end of the inclined bridge, H, which leads, or gives access, to the said platform. Near the manger O at the head of the stall is connected, by a hook and eye, a bar, C, which extends back to the rear of said stall, and is made adjustable in the jaw E, situated at the bottom of bar B, the use of which will be hereafter explained. Bar D is also provided with a hook at one end, which connects with the eye F, while the other end is allowed to rest in one of the notches of quadrant K. M is a metallic pin, which secures one end of bar B to one of the columns, and allows the other end to be vibrated at pleasure. By this means the passage may be opened or closed, and fastened by lifting it in or out of the metallic bracket-catch G upon the opposite column.

The cow is either led or driven to the platform A, through the passage at the bridge H, and is fastened to the manger O in the ordinary way. The bar B is then adjusted, which prevents her from backing. The bar C, after being hooked into eye N, is brought up against the left side of the cow, which forces her over to the side of the stall where the operator is to take position, who then slips the bar D between her hind legs in such a manner that when hooked in the eye F at the opposite side of the stall, and in one of the notches of the quadrant K, her kicking is absolutely insured against; and as her left hind leg is placed to the front of the bar, and her right to the rear of the same, her bag is clearly exposed to the operator at the opened portion of the fence surrounding the platform; and in case the cow is accompanied by a calf, (the strap L being suspended at the time near the left side of the cow,) the operator reaches under, and taking the strap fastens it to the neck of the calf, (which would naturally be near at the time, in the act of nursing,) and by the use of the other end of the cord or rope I the head of the calf could be elevated at any time thought proper; and while this entire operation of securing the animal or animals in question would occupy a short space of time, the process of milking would be reduced to almost a pleasure, and practiced with entire safety; but while performing the same task in the ordinary manner, you must encounter excessive labor and peril.

It may be here stated that many devices may be employed for the purpose of elevating the platform A at variable heights, or a foot-platform may be erected, which would answer the same purpose. Therefore I can make no particular claim in this respect; but What I do claim as my invention, and desire to secure by Letters Patent of the United States, is—

The elevated platform A, in combination with the adjustable bars B, C, and D, the whole being constructed, arranged, and operated as set forth.

ALEXANDER LOWE.

Witnesses:
 WM. W. GOODWIN,
 J. T. YEAROUT.